United States Patent
Sakurai

(10) Patent No.: US 8,237,947 B2
(45) Date of Patent: Aug. 7, 2012

(54) DEVICE-MANAGING SYSTEM, MANAGING APPARATUS, INFORMATION-PROCESSING APPARATUS, IMAGE-PROCESSING APPARATUS, AND CONTROL METHOD THEREOF

(75) Inventor: Masakatsu Sakurai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1260 days.

(21) Appl. No.: 11/690,649

(22) Filed: Mar. 23, 2007

(65) Prior Publication Data

US 2007/0229886 A1    Oct. 4, 2007

(30) Foreign Application Priority Data

Mar. 31, 2006  (JP) .................................. 2006-100391

(51) Int. Cl.
*G06K 15/00* (2006.01)
*G06F 3/12* (2006.01)

(52) U.S. Cl. ...................... 358/1.14; 358/1.15
(58) Field of Classification Search .................. 358/1.15
See application file for complete search history.

(56) References Cited

U.S. PATENT DOCUMENTS

| | | | |
|---|---|---|---|
| 7,400,427 B2 | 7/2008 | Honma | |
| 2002/0097431 A1* | 7/2002 | Ikegami | 358/1.15 |
| 2003/0167336 A1 | 9/2003 | Iwamoto et al. | |
| 2004/0141203 A1* | 7/2004 | Honma | 358/1.15 |
| 2005/0180793 A1* | 8/2005 | Nishiguchi | 400/76 |
| 2006/0053334 A1* | 3/2006 | Ingen et al. | 714/2 |

FOREIGN PATENT DOCUMENTS

| | | |
|---|---|---|
| CN | 1517851 | 8/2004 |
| EP | 1193593 A2 | 4/2002 |
| EP | 1378810 A2 | 1/2004 |
| JP | 2001100960 | 4/2001 |
| JP | 2002-202696 A | 7/2002 |
| JP | 2004-152108 | 5/2004 |
| JP | 2004-206467 A | 7/2004 |
| JP | 2006-018377 A | 1/2006 |

OTHER PUBLICATIONS

Office Action, dated Feb. 6, 2009, in CN 200710089804.3.
Japanese Office Action dated Jan. 7, 2011 concerning Japanese Patent Application No. 2006-100391.
European Search Report dated Nov. 7, 2011 concerning the corresponding European Patent Application No. 07105303.7.

* cited by examiner

*Primary Examiner* — Marivelisse Santiago Cordero
*Assistant Examiner* — Mesfin Getaneh
(74) *Attorney, Agent, or Firm* — Fitzpatrick, Cella, Harper & Scinto

(57) ABSTRACT

The managing apparatus (14) issues device-control information of the device to a user of the information processing apparatus. The information processing apparatus (1) determines whether or not the device-control information has been received. If the device-control information has not been received, device-control information prepared in advance is obtained. If the device-control information has not been received, a job for executing processing within the range of the obtained device-control information is sent to the device via a network. If the device-control information has been received, a job for executing processing within the range of the received device-control information is sent to the device. The device (19) processes the received job within the range of the obtained device-control information.

8 Claims, 11 Drawing Sheets

FIG. 1B

```
<ACT>
  <User>Sato</User>
  <Quota>
    <Copy>
      <Color>0</Color><Total>300</Total></Copy>
    <PDL>
      <Color>100</Color><Total>300</Total></PDL>
    <Scan>
      <Color>100</Color><Total>-</Total></Scan>
  </Quota>
  <Layout>2</Layout>
  <Plex>duplex</Plex>
  <Punch>OK</Punch>
  <Staple>NG</Staple>
  <Usage>
    <Copy>
      <Color>0</Color><Total>3</Total></Copy>
    <PDL>
      <Color>13</Color><Total>32</Total></PDL>
    <Scan>
      <Color>7</Color><Total>-</Total></Scan>
  </Usage>
</ACT>
```

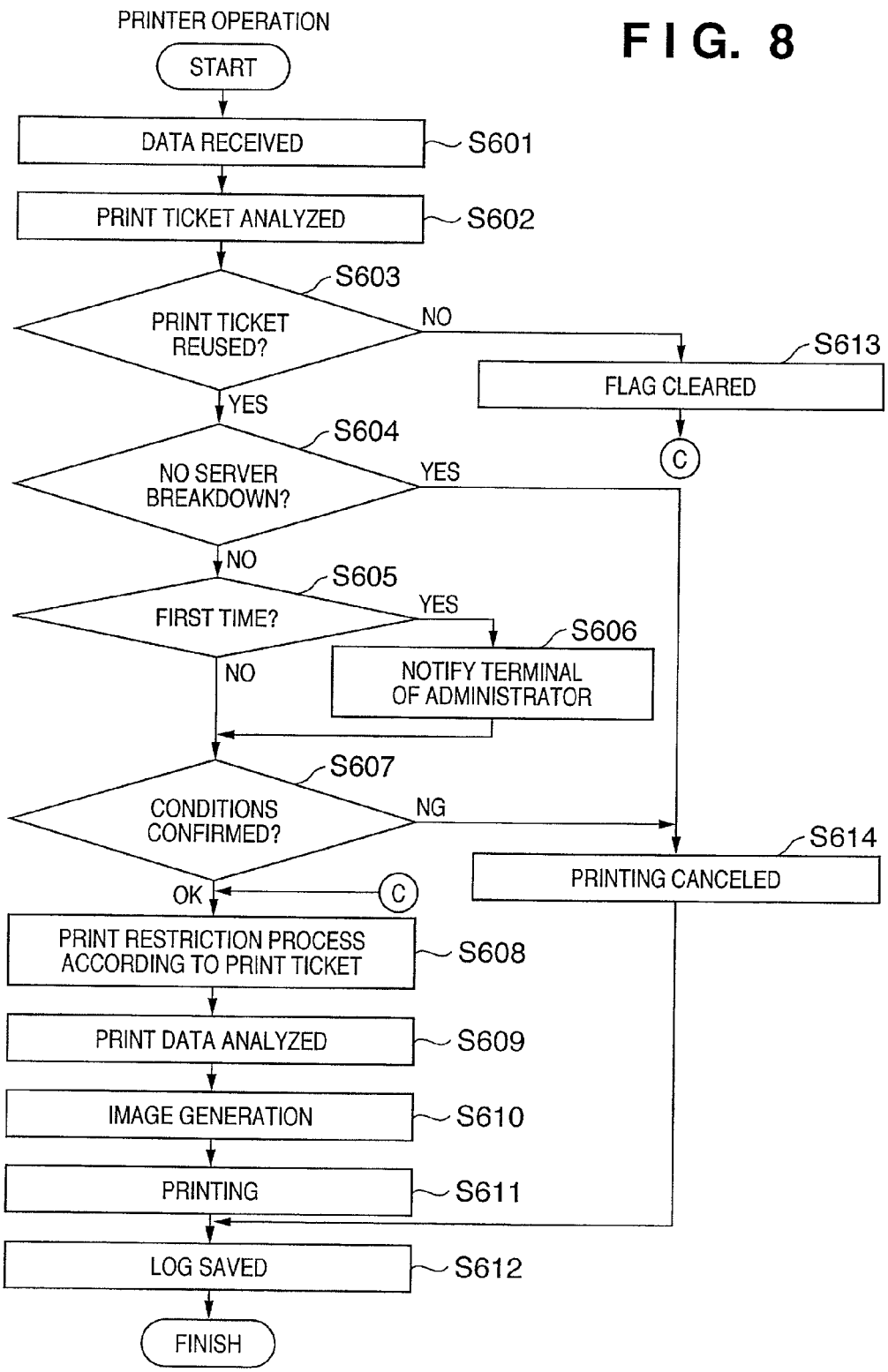

DEVICE-MANAGING SYSTEM, MANAGING APPARATUS, INFORMATION-PROCESSING APPARATUS, IMAGE-PROCESSING APPARATUS, AND CONTROL METHOD THEREOF

BACKGROUND OF THE INVENTION

1. Field of the Invention

The present invention relates to a device-managing system having a device, a managing apparatus that issues device-control information for controlling the device, and an information-processing apparatus that generates jobs, which are processed in the device according to the device-control information.

2. Description of the Related Art

In recent years, copiers have gone beyond their function of copying originals and have multiple types of functions such as a function of printing print jobs from external clients and moreover a function of electrically sending scanned originals externally using an email or file transfer function. Such copiers are called MFPs (multi-function peripherals).

While MFPs have become more multifunctional, problems have arisen involving information management such as an increased risk of information leakage due to scanned information being able to be sent externally. And although this has long been an issue, since the cost of paper and toner that is consumed increases along with an increased number of sheets printed, there is a need to restrict the number of sheets that can be printed by each user.

Addressing these issues is an important issue from a perspective of reducing the TCO (total cost of ownership). When this issue is seen from a perspective of an administrator of the system or device, it would seem that there is a need to centrally set for each user the functions that can be used and an upper limit number of sheets that can be used, as well as to appropriately manage the amount of resources (number of sheets of paper for example) to be used by each user.

Several techniques for addressing this issue have already been proposed.

For example, Japanese Patent No. 3385258 describes as a method for restricting functions a method in which "print tokens" functioning as print function restriction information are generated by a management server and function restrictions are achieved by distributing these in advance to printer.

However, there is a problem with the above-mentioned conventional technique in that print tokens cannot be obtained when a malfunction occurs in the server that generates or manages the print tokens, and therefore printing cannot be carried out.

SUMMARY OF THE INVENTION

The present invention has been devised to address at least one of these issues. One aspect of the present invention provides an apparatus which maintains function restrictions relating to devices while improving convenience by appropriately allowing function usage even during occurrences of breakdowns.

One embodiment of the present invention provides a device-management system comprising a management apparatus configured to issue device-control information indicating usage restriction of a device, an information-processing apparatus that issues a job to be processed on the device within a scope of the device-control information, and the device for processing the job, wherein the management apparatus comprises issuing means arranged to issue device-control information of the device to the information-processing apparatus, wherein the information-processing apparatus comprises receiving means arranged to receive device-control information issued by the issuing means, determination means arranged to determine whether or not the receiving means has received the device-control information, obtaining means arranged to obtain device-control information prepared in advance in the case that a determination is made that the receiving means has not received the device-control information, and transmission means arranged to transmit to the device via a network a job for executing processing within the scope of the device-control information obtained by the obtaining means in the case that the determination means determines that the receiving means has not received the device-control information, and transmits to the device a job for executing processing within the scope of the device-control information received by the receiving means in the case that the determination means determines that the device-control information has been received, wherein the device comprises receiving means arranged to receive a job sent by the transmission means from the information-processing apparatus, and processing means arranged to process the job received by the receiving means within the scope of the device-control information.

Another embodiment of the present invention provides an information-processing apparatus for transmitting, to a device, a job associated with device-control information which has been received from a management apparatus, wherein the job is executed within a scope of the device-control information indicating usage restriction of a device, the information-processing apparatus comprising receiving means arranged to receive the device-control information from the management apparatus, determination means arranged to determine whether or not the device-control information has been received from the management apparatus, obtaining means arranged for obtaining device-control information prepared in advance in the case that the determination means determines that the device-control information has not been received from the management apparatus and transmission means arranged to transmit, to the device, a job to be executed within the scope of the device-control information obtained by the obtaining means in the case that the determination means determines that the device-control information has not been received from the management apparatus, and to transmit, to the device, a job to be executed within the scope of the device-control information received by the receiving means in the case that the determination means determines that the device-control information has been received from the management apparatus.

Still another embodiment of the present invention provides a management apparatus to which connected via a network are an information-processing apparatus that generates a device job for processing on a device in accordance with device-control information relating to usage restriction of the device and a device that carries out a process based on the device job, and which management apparatus is arranged to generate the device-control information, comprising issuing means arranged to issue the device-control information of the device to an information-processing apparatus in response to a request from the information-processing apparatus via the network, and setting means arranged to set reuse-allowability information indicating allowability of reuse of the device-control information.

Yet another embodiment of the present invention provides an image-processing apparatus configured to communicate with a management apparatus that issues device-control information indicating usage restriction of a device and an information-processing apparatus that generates a job to be processed on the device according to the device-control information issued by the management apparatus, comprising transmission means arranged to transmit device-restriction information that has been prepared to the information-processing apparatus receiving means arranged to receive a job, which includes device-restriction information, sent by the transmission means from the information-processing apparatus determination means that, when the device-control information contained in a job received by the receiving means permits reuse of the device-control information, determines the validity of the device-control information based on restriction-information indicating reuse conditions contained therein and processing means arranged to process the job based on a determination result of the determination means.

Still yet another embodiment of the present invention provides a control method for an information-processing apparatus that sends to a device a job including device-control information that has been received from a management apparatus and by which a process is executed within a scope of the device-control information indicating usage restriction of a device, comprising the steps of receiving the device-control information from the management apparatus, determining whether or not the device-control information has been received from the management apparatus, obtaining device-control information prepared in advance in the case that it is determined in the determination step that the device-control information has not been received from the management apparatus, and transmitting to the device a job for executing processing within the scope of the device-control information obtained in the obtaining step in the case that in the determination step that the device-control information has not been received from the management apparatus, and transmitting a job for executing processing within the scope of the device-control information received in the receiving step in the case that it is determined in the determination step that the device-control information has been received from the management apparatus.

Yet still another embodiment of the present invention provides a control method for a management apparatus to which is connected via a network to an information-processing apparatus that generates a device job for processing on a device in accordance with device-control information relating to usage restriction of the device, and a device that carries out a process based on the device job, and which management apparatus generates the device-control information, comprising the steps of issuing device-control information of the device to the information-processing apparatus in response to a request from the information-processing apparatus via the network, and setting reuse-allowability information indicating allowability of reuse of the device-control information.

Still yet another embodiment of the present invention provides a control method for an image-processing apparatus which communicates with a management apparatus that issues device-control information indicating usage restriction of a device, and an information-processing apparatus that generates a job to be processed on the device according to the device-control information issued by the management apparatus, comprising the steps of sending device-restriction information that has been prepared to the information-processing apparatus, receiving a job, which includes device-restriction information, sent in the sending step from the information-processing apparatus, determining, when device-control information contained in a job received in the receiving step permits reuse of the device-control information, the validity of the device-control information based on restriction-information indicating reuse conditions contained therein, and processing the job based on a determination result of the determination step.

Further features of the present invention will be apparent from the following description of exemplary embodiments with reference to the attached drawings.

BRIEF DESCRIPTION OF THE DRAWINGS

FIG. 1B shows one example of an ACT (Access Control Token) according to the first embodiment of the present invention.

FIG. 8 is a flowchart showing a printing operation of the printer according to the first embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1A:
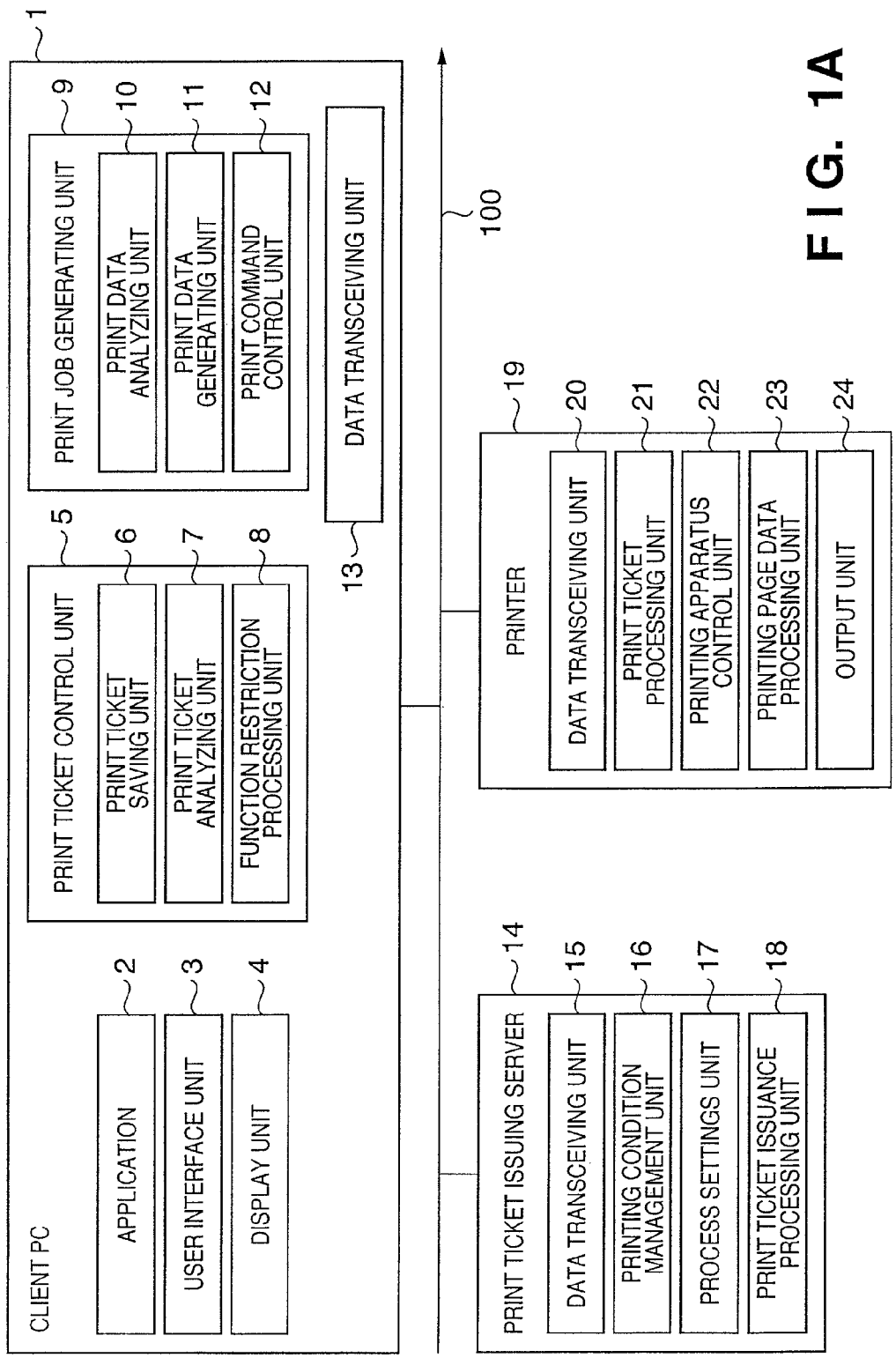
FIG. 1A shows a functional configuration of a printing control system according to a first embodiment of the present invention.

FIG. 1A shows a functional configuration of a printing control system according to a first embodiment of the present invention.

Connected via a network 100 in the printing control system in FIG. 1A are a client PC 1, a print-ticket issuing server 14, and a printer 19.

In the client PC 1, numeral 2 indicates an application that carries out various processes such as data generation and editing, and has a role at a time of commencement of printing of sending data to be printed to a print job generating unit 9. Numeral 3 indicates a user-interface unit, which provides an input interface (operation windows and the like) for inputting various print settings to the printer 19 such as paper size, double-side instructions, print resolution, and print gradations, and inputting instructions to commence printing. Numeral 4 indicates a display unit, which outputs display of various images such as a preview display of print data.

Numeral 5 indicates a print-ticket control unit. The print-ticket control unit 5 manages within the client PC 1 print tickets that are obtained from the print-ticket issuing server 14 and that describe various printing conditions and printing-restriction information, or analyzes the print tickets, or carries out print-function restriction processing based on the contents of the print tickets. Within the print-ticket control unit 5 is configured a print-ticket saving unit 6 that saves obtained print tickets for further reuse and, in the initial state of the present system, saves default print tickets.

Also configured within the print-ticket control unit 5 are a print-ticket analyzing unit 7 which further analyzes the print tickets and extracts printing conditions and printing-restriction information, and a function-restriction processing unit 8 that carries out function-restriction processing during printing based on an analysis result of the print-ticket analyzing unit 7.

Numeral 9 indicates the print-job generating unit, which receives print data specified from the application 2 and generates a print job to be sent to the printer 19. Configured within the print-job generating unit 9 are a print-data analyzing unit 10, which analyzes print data that has been inputted from the application 2, and a print-data generating unit 11, which generates PDL (page description language) data for the printer 19. Also configured within the print-job generating unit 9 is a print-command control unit 12 that obtains a printing status of the printer 19 and performs control of all commands for sending and receiving PDL data to and from the printer 19.

It should be noted that print jobs generated by the print-job generating unit 9 include both a case where the print job is generated within the printer 19 from the beginning and a case where a job inputted from an external source is selected and sent.

Numeral 13 indicates a data-transceiving unit, which carries out sending and receiving of data via the network 100 with the print-ticket issuing server 14 or the printer 19.

Numeral 14 indicates the print-ticket issuing server, which carries out processing for issuing print tickets including printing-restriction information at times of reuse based on print-ticket issuance requests of each user from the client PC 1 connected via the network 100. Also configured within the print-ticket issuing server 14 are a data-transceiving unit 15 for sending and receiving data to and from the client PC 1 connected via the network 100, and a printing-condition management unit 16, which manages printing conditions assigned to each user.

Examples of printing conditions include (whether or not) printing is permitted/prohibited, (whether or not) color printing is permitted/prohibited, (whether or not) single sided printing is permitted/prohibited, and whether or not to override printing so that multiple pages are reduced to fit into a single page. Furthermore, it is also possible to set these printing conditions for each output destination such as the application 2 and the printer 19.

Numeral 17 indicates a process-settings unit that functions in particular when a server malfunction occurs. When a malfunction occurs in the print-ticket issuing server 14 and print-ticket issuance cannot be carried out, the process-settings unit 17 specifies whether or not reuse of already-issued print tickets is allowed and the reuse conditions when reuse is permitted.

Examples of settable reuse conditions include a value for a number of times reuse of a print ticket is to be permitted, or a period in which reuse of the print ticket is valid, or additional print-log information to be held when printing based on reuse, or print-instruction information of appended information in a print page. It should be noted that instances where "reuse" is expressed in the first embodiment may be reworded "replay."

Numeral 18 indicates a print-ticket issuance processing unit, which carries out processing for generating and issuing print tickets including printing-restriction information at times of reuse for print-ticket issuance requests from the client PC 1.

Numeral 19 indicates the printer, which carries out print processing in response to instructions from the client PC 1 connected via the network 100, or carries out responses and the like regarding the printing status, and also carries out status checks and the like of the print-ticket issuing server 14. Also configured within the printer 19 is a data-transceiving unit 20 for sending and receiving data between the client PC 1 and the print-ticket issuing server 14, which are connected via the network 100. Moreover, configured within the printer 19 is a print-ticket processing unit 21 for processing the print tickets received by the data-transceiving unit 20.

The print-ticket processing unit 21 also carries out a process of determining whether or not a print ticket contained in print data is valid and a process of determining whether or not reuse is permitted in cases where the print tickets are being reused. Furthermore, the print-ticket processing unit 21 carries out a process of checking whether or not the print-ticket issuing server 14 is in a state unable to issue print tickets, or a process of holding print tickets.

Numeral 22 indicates a printing-apparatus control unit, which analyzes data received by the data-transceiving unit 20 and converts a processing state of the printer 19 into a command format to generate data to send to the client PC 1 via the data-transceiving unit 20. Numeral 23 indicates a printing-page data processing unit, which analyzes the print data sent by the client PC 1 until final print-image generation based on a paper-discharge code, and also generates and accumulates print logs. Numeral 24 indicates an output unit, which carries out output control and printing output of print data generated by the printing-page-data processing unit 23.

Here the print tickets are achieved by device-control information typified by an ACT (access control token) in which are recorded usage amounts for each unit period, upper-limit amounts, and allowability of usage of functions. In other words, an ACT is data that has a role in transmitting from the server to a device (for example, a printer) access-restriction information for users allowed to use the system. The ACT describes information relating to function-restriction items for job execution by a user and upper-limit values including an upper limit of number of sheets for printing.

Here, one example of an ACT is described using FIG. 1B.

FIG. 1B shows one example of an ACT according to the first embodiment of the present invention.

Here, for example, an ACT including device-control information and usage records is expressed using XML language. Meanings of the tags are indicated below.

| Tag name | Description |
| --- | --- |
| ACT | ACT |
| Quota | upper-limit restriction |
| Copy | copy |
| PDL | PDL printing |

-continued

| Tag name | Description |
| --- | --- |
| Color | No. of pages of color output |
| Total | No. of pages including color, black-and-white output |
| Layout | Smallest logical page to be assigned to single physical page |
| Punch | Allowability of punching functions |
| Staple | Allowability of stapling functions |
| Usage | Usage records |

It should be noted that the Quota portion (<Quota> to </Quota>) is information obtained from the printing-condition management unit 16. Furthermore, the Usage portion (<Usage> to </Usage>) is information obtained from the client PC 1.

Figure 1C:
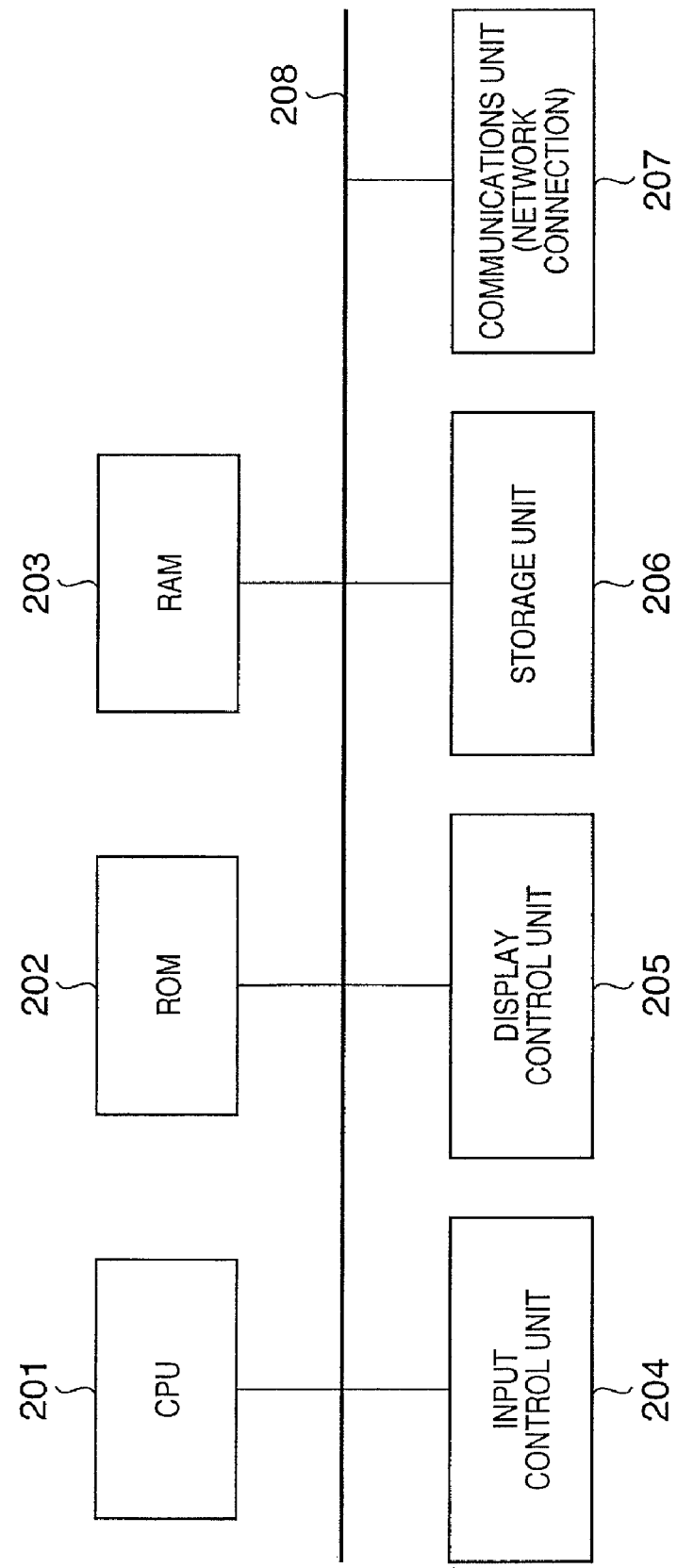
FIG. 1C is a block diagram showing a hardware configuration of an information processing apparatus according to the first embodiment of the present invention.

Next, a hardware configuration of an information-processing apparatus for achieving the client PC 1 and the print-ticket issuing server 14 respectively is described using FIG. 1C.

FIG. 1C is a block diagram showing a hardware configuration of an information-processing apparatus according to the first embodiment of the present invention.

In FIG. 1C, numeral 201 indicates a CPU, that is, a central processing unit, which carries out overall control of the computer device and arithmetic processing and the like. Numeral 202 indicates a ROM, that is, a read-only memory, which is a storage area for various data such as system startup programs, applications, and parameters. Numeral 203 indicates a RAM, that is, a random access memory, which is a data storage area without usage restrictions. The RAM 203 is an area into which an operating system (OS), applications, device drivers, and programs for communication control and the like are loaded and executed.

Numeral 204 indicates an input control unit, which receives input data through input devices such as a keyboard and pointing device (for example, a mouse) for transfer to the CPU 201. Numeral 205 is a display control unit, which executes display control for a display device. It should be noted that examples of display devices are CRTs, LCDs, and the like.

Numeral 206 indicates a storage unit. This is a so-called external storage device, which includes for example a floppy (registered trademark) disk device, a hard-disk device, and an SRAM (nonvolatile storage unit). The storage unit 206 stores and accommodates programs and data, which are referenced or loaded into the RAM 202 as required during execution. Numeral 207 indicates a communications unit, which carries out network communications control and is able to communicate with other computers (for example, the client PC 1 or the print-ticket issuing server 14) and peripheral devices (for example, the printer 19) connected on the network 100 of FIG. 1A. Numeral 208 indicates a system bus that connects between the aforementioned structural elements and achieves routes for sending and receiving data.

Figure 1D:
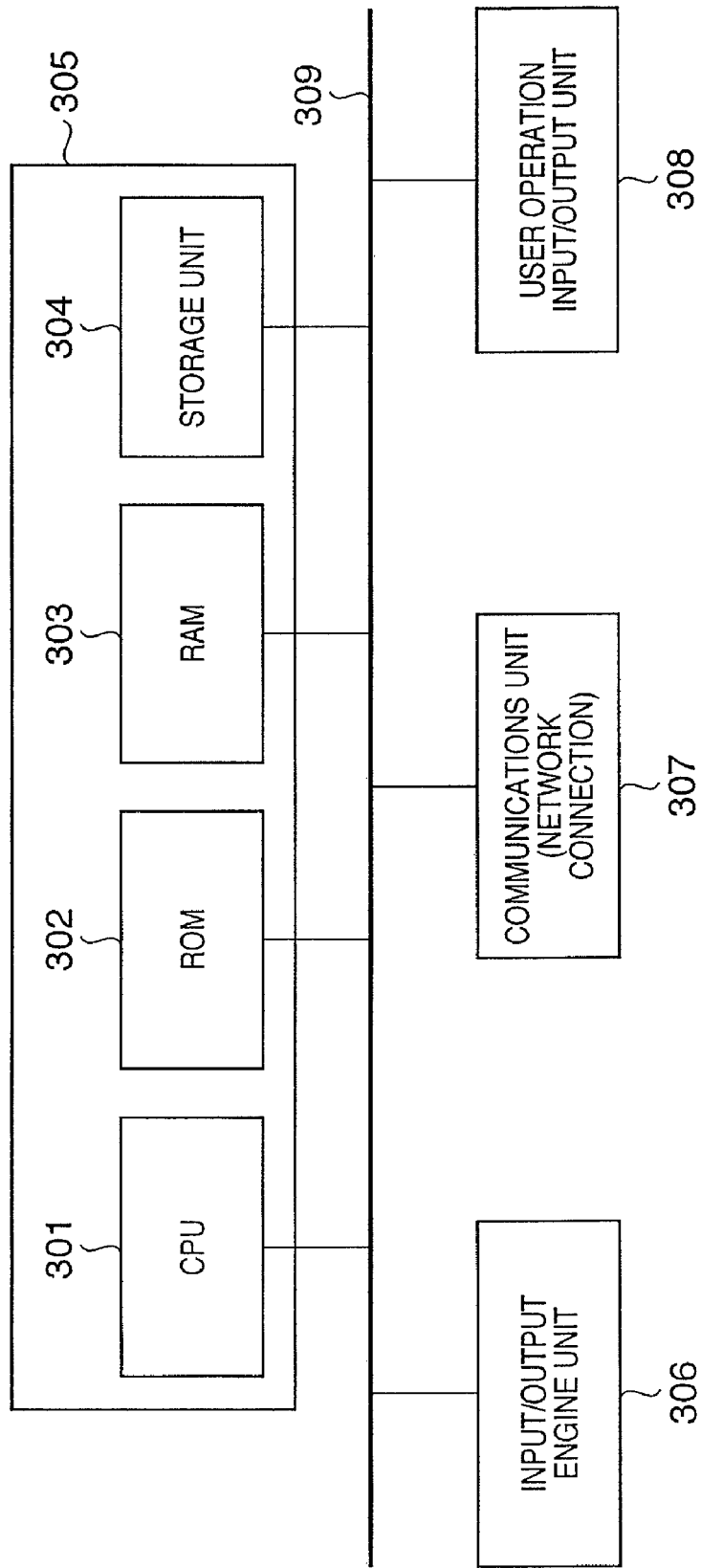
FIG. 1D is a block diagram showing a hardware configuration of a printer according to the first embodiment of the present invention.

Next, a hardware configuration of the printer 19 is described using FIG. 1D.

FIG. 1D is a block diagram showing a hardware configuration of a printer according to the first embodiment of the present invention.

It should be noted that the printer 19 of FIG. 1D uses as an example a case of an MFP having a plurality of functions including a printing function, a scanning function, and a data-transceiving function.

In FIG. 1D, numeral 305 indicates a controller unit that controls the entire printer 19. Numeral 301 indicates a CPU, that is, a central processing unit, which carries out control and arithmetic processing and the like for the controller unit 305 as part of an internal configuration of the controller 305. Numeral 302 indicates a ROM, that is, a read-only memory, which is a storage area for various data such as system startup programs, applications, and parameters. Numeral 303 indicates a RAM, that is, a random access memory, which is a data storage area without usage restrictions. Numeral 304 indicates a storage unit. This is a so-called external storage device, which includes for example a hard-disk device and an SRAM or the like.

The RAM 303 is an area into which an operating system (OS) and programs for communication control and engine control and the like are loaded and executed. Numeral 306 indicates an input/output engine unit, which executes printing operations and image-reading operations under the control of the controller 305. As a specific example, the input/output engine unit 306 is configured having a printer engine for executing printing using a printing method such as a laser-beam method, and a scanner engine having a paper feeding mechanism such as ADF (Auto Document Feeder).

Numeral 307 indicates a communications unit, which carries out network-communications control and is able to communicate with the client PC 1 and the print-ticket issuing server 14 on the network 100 of FIG. 1A. Numeral 308 indicates a user operation input/output unit, which carries out interactive settings operations with the user. For example, the user operation input/output unit 308 is configured from an input device such as a touch panel and various keys and buttons, and a display device. Numeral 309 indicates a system bus that connects between the aforementioned structural elements and achieves routes for sending and receiving data.

Figure 2:
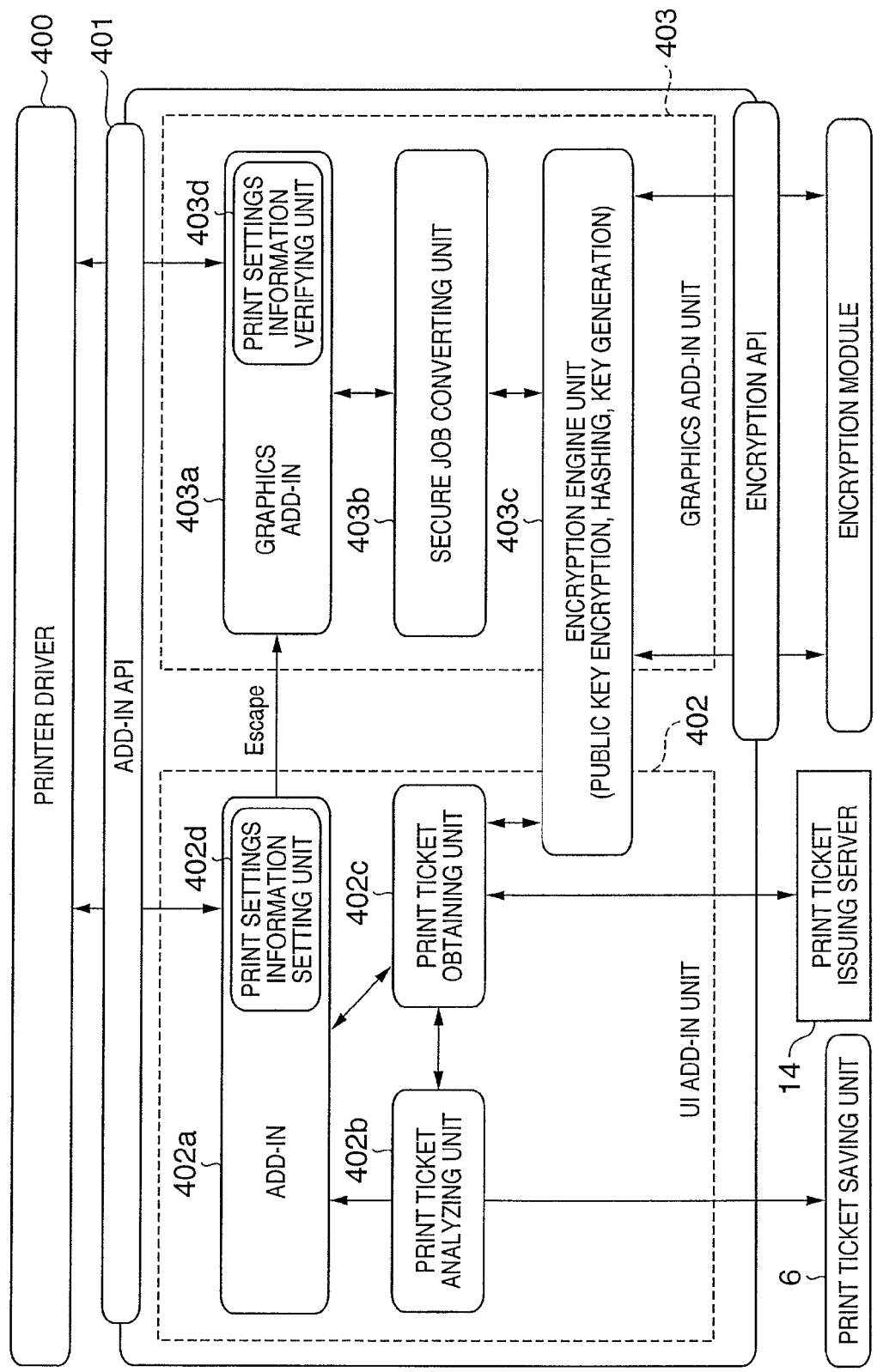
FIG. 2 shows a software configuration of a client PC according to the first embodiment of the present invention.

Next, a main software configuration of the client PC 1 is described using FIG. 2.

FIG. 2 shows a software configuration of the client PC according to the first embodiment of the present invention.

In the first embodiment, a system of add-ins is arranged that appends (adds) functions to a printer driver 400 of the printer 19. This makes it possible to add various functions to the client PC 1. The add-ins are constituted by a UI add-in unit 402 and a graphics add-in unit 403, and exchange between these units and the printer driver 400 is carried out from their respective add-in I/F 402a and 403a via an add-in API (Application Programming Interface) 401.

Configured within the UI add-in unit 402 are a print-ticket obtaining unit 402c, which obtains centrally managed print tickets from the print-ticket issuing server 14, and a print-ticket analyzing unit 402b, which analyzes print tickets that have been obtained and saves them in the print-ticket saving unit 6. Also configured within the UI add-in unit 402 are a print-settings-information setting unit 402d for setting print tickets in the driver information of the OS and an encryption engine unit 403c for generating encrypted information to be used in falsification detection.

Here, when instruction has been given for print commencement, the UI add-in unit 402 obtains a print ticket from the print-ticket saving unit 6 and sets this in the driver information, then sends the print ticket and encryption information to be used in falsification detection to the graphics add-in unit 403. Furthermore, when the print-settings window created by the printer driver 400 is closed, the UI add-in unit 402 compares the settings information in that print settings window with the printing-restriction information and displays a warning message if there is any discrepancy between these.

Configured within the graphics add-in unit 403 are a print-settings-information verifying unit 403d, which verifies driver information, and a secure-job converting unit 403b, which converts print-job data into data enabling detection of falsification. Furthermore, configured within the graphics add-in unit 403 is the encryption-engine unit 403c, which generates encryption information necessary for falsification detection.

When instruction has been given for print commencement, the graphics add-in unit 403 verifies whether or not the device-control information is reflected in the driver information. Then, the print ticket containing the device-control information is added to the print-job data sent from the printer driver 400. Next, using the encryption information created by the encryption-engine unit 403c, the print-job data is converted by the secure-job converting unit 403b into data enabling detection of falsification.

Figure 3:
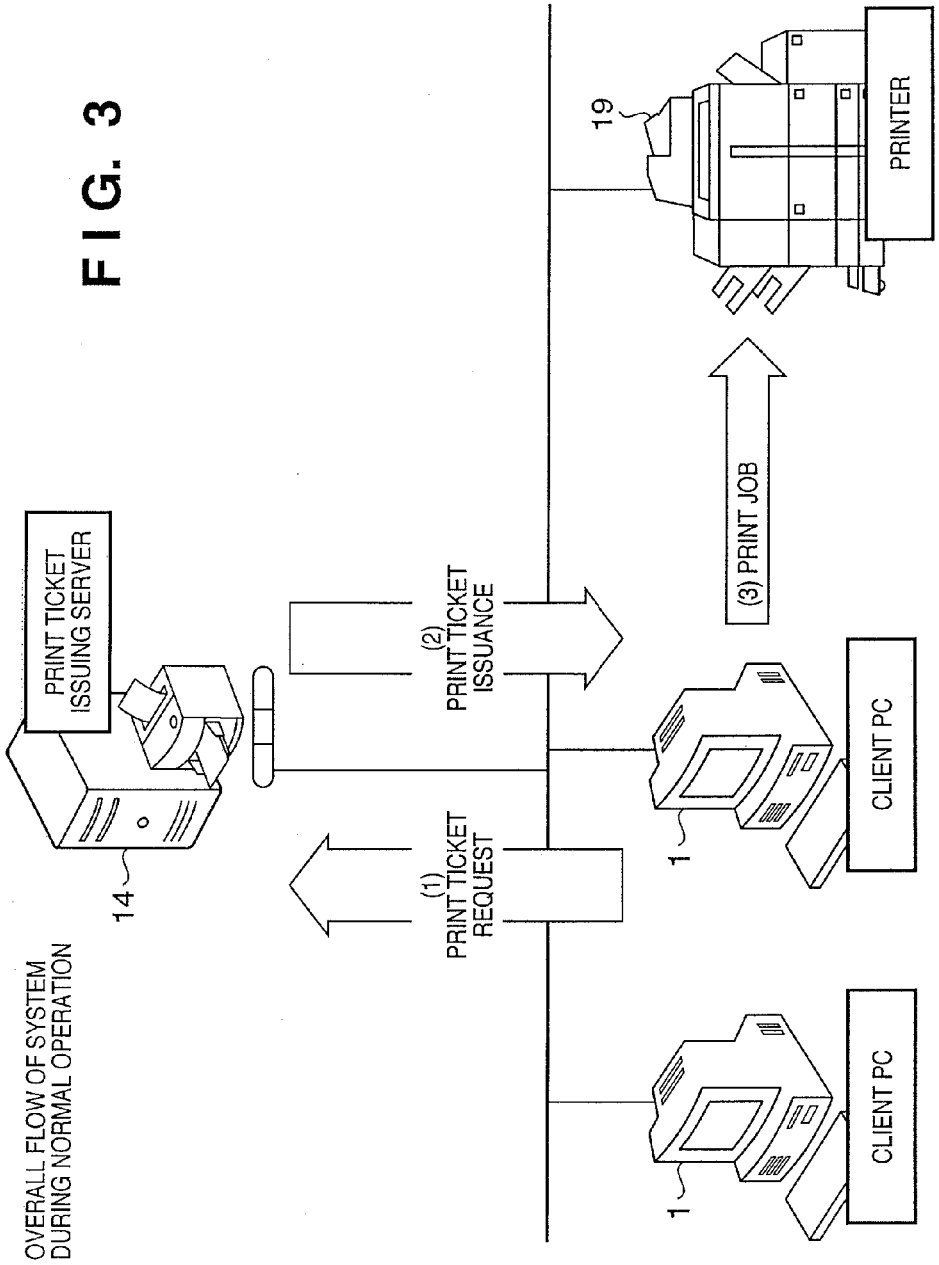
FIG. 3 is a diagram for describing a processing flow of a printing control system during normal operation of a print-ticket issuing server according to the first embodiment of the present invention.

Next, description is given using FIG. 3 concerning a processing flow of the printing control system during normal operation of the print-ticket issuing server 14 of the first embodiment.

FIG. 3 is a diagram for describing a processing flow of the printing-control system during normal operation of the print-ticket issuing server according to the first embodiment of the present invention.

In FIG. 3, first, (1) a client PC 1 sends a print-ticket request to the print-ticket issuing server 14 along with user information and output destination printer information.

Next, (2) the print-ticket issuing server 14 carries out user authentication based on the user information and, if the user is legitimate, obtains printing condition information, which is managed for each user inside the print-ticket issuing server 14, then generates a print ticket based on a combination of this with the output destination-printer information. Then, the print-ticket issuing server 14 sends the print ticket to the client PC 1.

Next, (3) the client PC 1 saves the obtained print ticket and generates a print job for sending to the printer 19 according to the printing conditions described in the print ticket.

With the above-described processing, printing can be provided according to the printing condition information managed for each user by the print-ticket issuing server 14.

Figure 4:
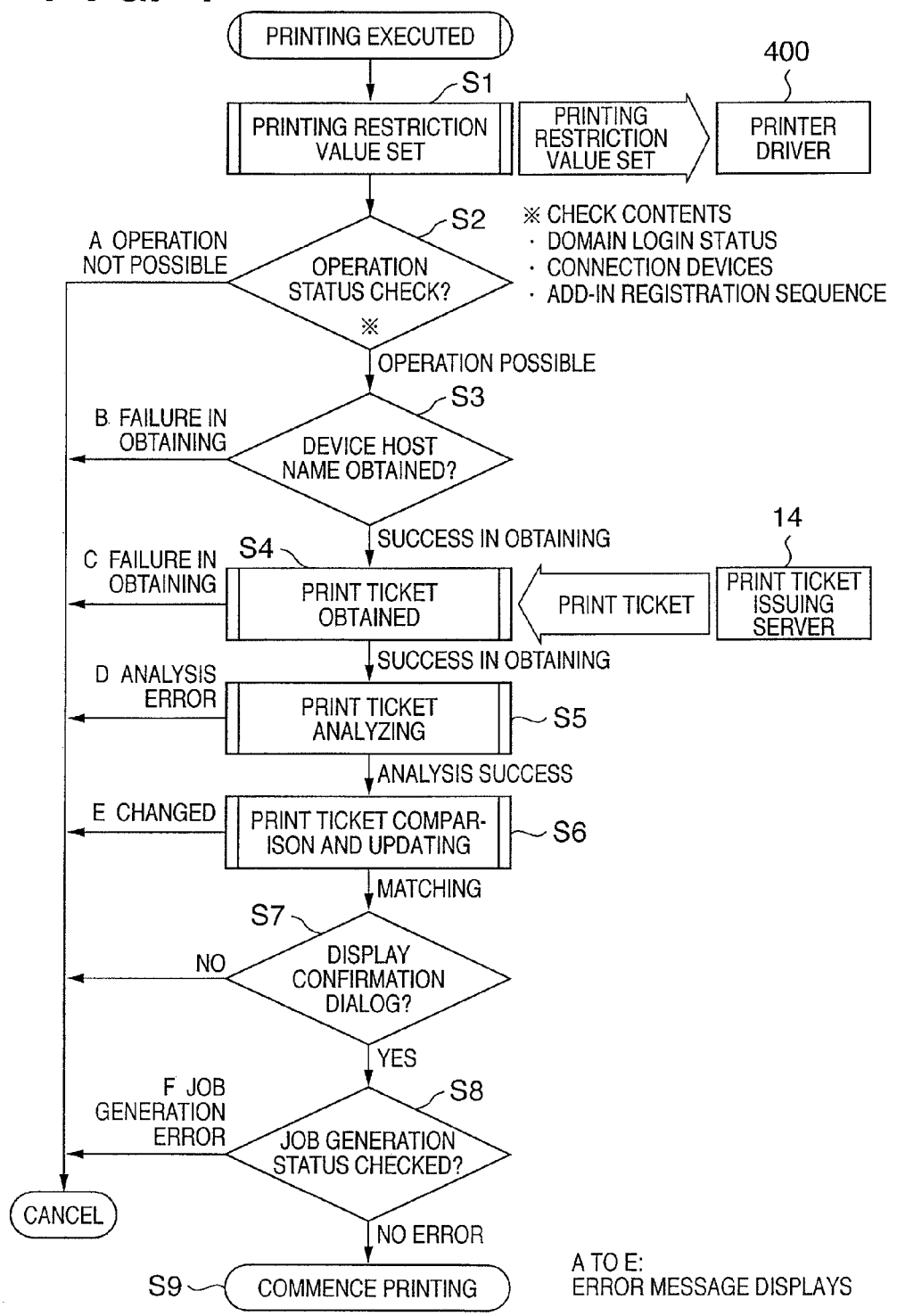
FIG. 4 is a flowchart showing a process executed by the client PC according to the first embodiment of the present invention.

Next, processing from print execution until print commencement by the client PC 1 is described using FIG. 4.

FIG. 4 is a flowchart showing a process executed by the client PC according to the first embodiment of the present invention.

Step S1: the print-settings-information setting unit 402d sets a printing-restriction value in the printer driver 400.

Step S2: the UI add-in unit 402 checks the following operational states.

(1) When the user is not logged on to the domain pertaining to the print-ticket issuing server 14, a warning message is displayed and printing is canceled.

(2) When the device for output is not connected to a standard TCP/IP, a warning message is displayed and printing is canceled.

(3) When the present add-in is not installed in a correct sequence with other add-ins, a warning message is displayed and printing is canceled.

Step S3: the UI add-in unit 402 obtains a device host name of the device that will perform printing. When a device host name cannot be obtained, a warning message is displayed and printing is canceled.

Step S4: the print-ticket obtaining unit 402c obtains the latest print ticket from the print-ticket issuing server 14.

When there is a failure in obtaining a print ticket, a process to be described later is executed for the case of there being a failure in obtaining a print ticket.

Step S5: the print-ticket analyzing unit 402b analyzes the print ticket and obtains the printing-restriction value. Also, the following process is executed.

(1) When there is a failure in analyzing the print ticket, a warning message is displayed and printing is canceled.

(2) When there is no usage authority for the selected device, a warning message is displayed and printing is canceled.

(3) The print ticket is saved as a file in the print-ticket storing saving 6.

Step S6: the UI add-in unit 402 compares the obtained printing-restriction value and the printing-restriction value that is saved in the registry maintained in the RAM 203. Then, when a result of the comparison is that the printing-restriction value has changed, the latest printing-restriction value is updated. Furthermore, a warning message is displayed and printing is canceled.

Step S7: the UI add-in unit 402 confirms the execution of print processing.

When confirmation is specified using a print confirmation dialog at the UI add-in unit 402, the print confirmation dialog is displayed for "yes" or "no" to be selected. When "yes" is selected, printing commences. When "no" is selected, printing is canceled.

When confirmation is not specified using a print confirmation dialog at the UI add-in unit 402, processing proceeds without the print confirmation dialog being displayed.

Step S8: the UI add-in unit 402 checks the following job generation states.

(1) When there is an item in which a printing-restriction value cannot be set and cancellation has been specified by an operation when a combined use prohibition setting has occurred, a warning message is displayed and printing is canceled.

(2) When the logged on user name and the user name that is set in the print job do not match, a warning message is displayed and printing is canceled.

(3) When overlay printing/registration is specified, a warning message is displayed and printing is canceled.

(4) When box storing is selected in the print settings while "prohibited" is specified for box storing, a warning message is displayed and printing is canceled.

(5) When the printing-restriction value has been exceeded due to selection of printing with a special layout, a warning message is displayed and printing is canceled.

(6) When the printing-restriction value has been exceeded in a state while poster printing has been selected, a warning message is displayed and printing is canceled.

Step S9: printing commences.

Figure 5:
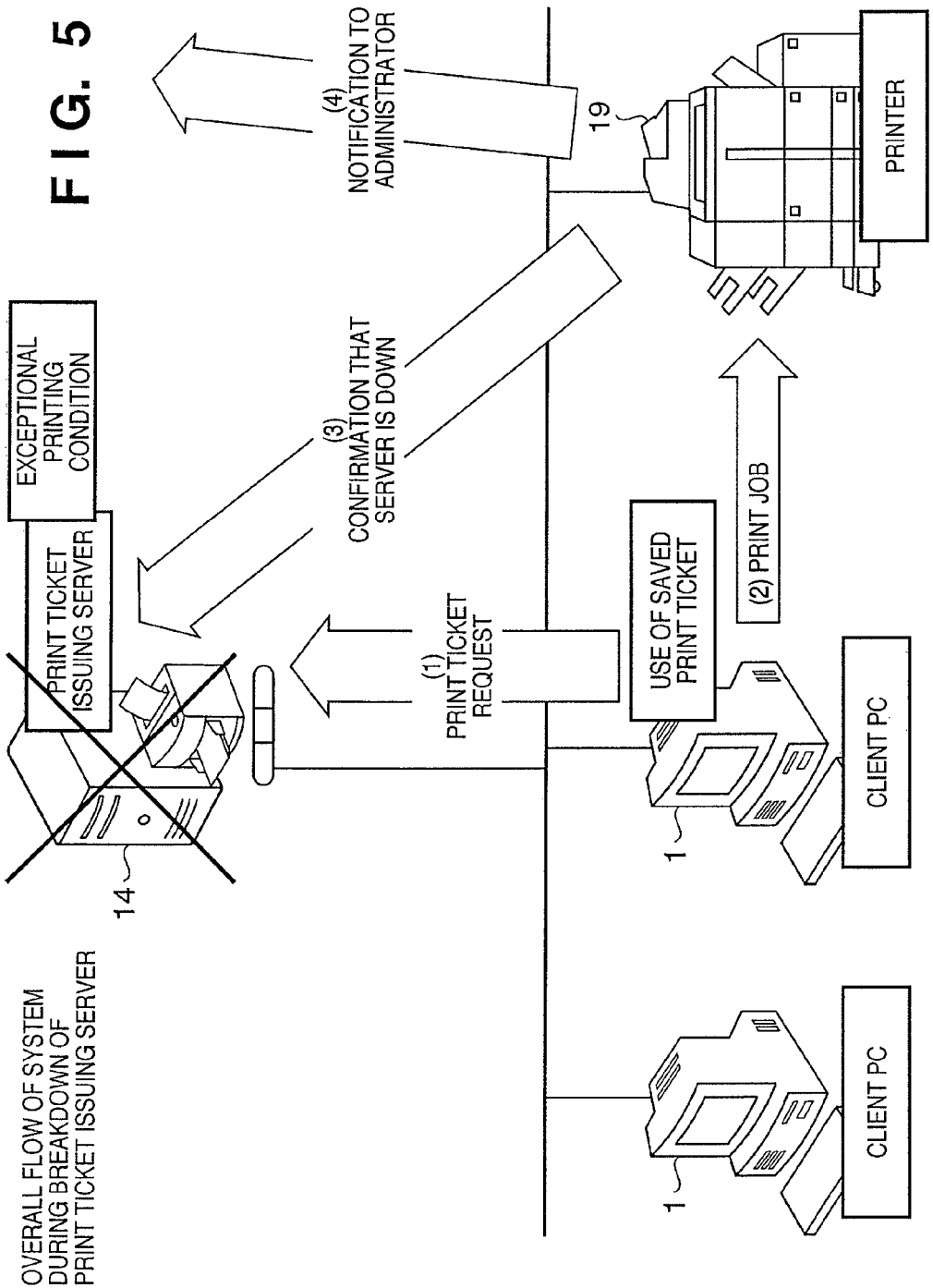
FIG. 5 is a diagram for describing a processing flow of the printing control system during a breakdown of the print-ticket issuing server according to the first embodiment of the present invention.

Next, description is given using FIG. 5 concerning a processing flow of the printing-control system during a breakdown of the print-ticket issuing server of the first embodiment.

FIG. 5 is a diagram for describing a processing flow of the printing-control system during a breakdown of the print-ticket issuing server according to the first embodiment of the present invention.

In FIG. 5, first, (1) a client PC 1 sends a print-ticket request to the print-ticket issuing server 14 along with user information and output destination-printer information.

Next, (2) when a print ticket cannot be obtained due to a breakdown of some kind such as the print-ticket issuing server 14 being down, the client PC 1 generates a print job in the following manner and sends this to the printer 19. Specifically, a print job is generated for sending to the printer 19 according to a print ticket that was saved previously or immediately previously as well as exceptional printing conditions set within the print ticket. Alternatively, a print ticket may be used that has been saved by an administrator in advance in the print-ticket saving unit 6.

(3) Since a print ticket is being reused, the printer 19 confirms whether or not the print-ticket issuing server 14 is down. (4) If the printer 19 confirms that the print-ticket issuing server 14 is down, it informs the administrator of this if notification has not already been given to the administrator. The printer 19 carries out printing in accordance with the printing-restriction information recorded in the print ticket.

The above-described processing is an operation of the entire printing control system including the client PC 1 and the printer 19 at the time of a breakdown of the print-ticket issuing server 14.

Figure 6:
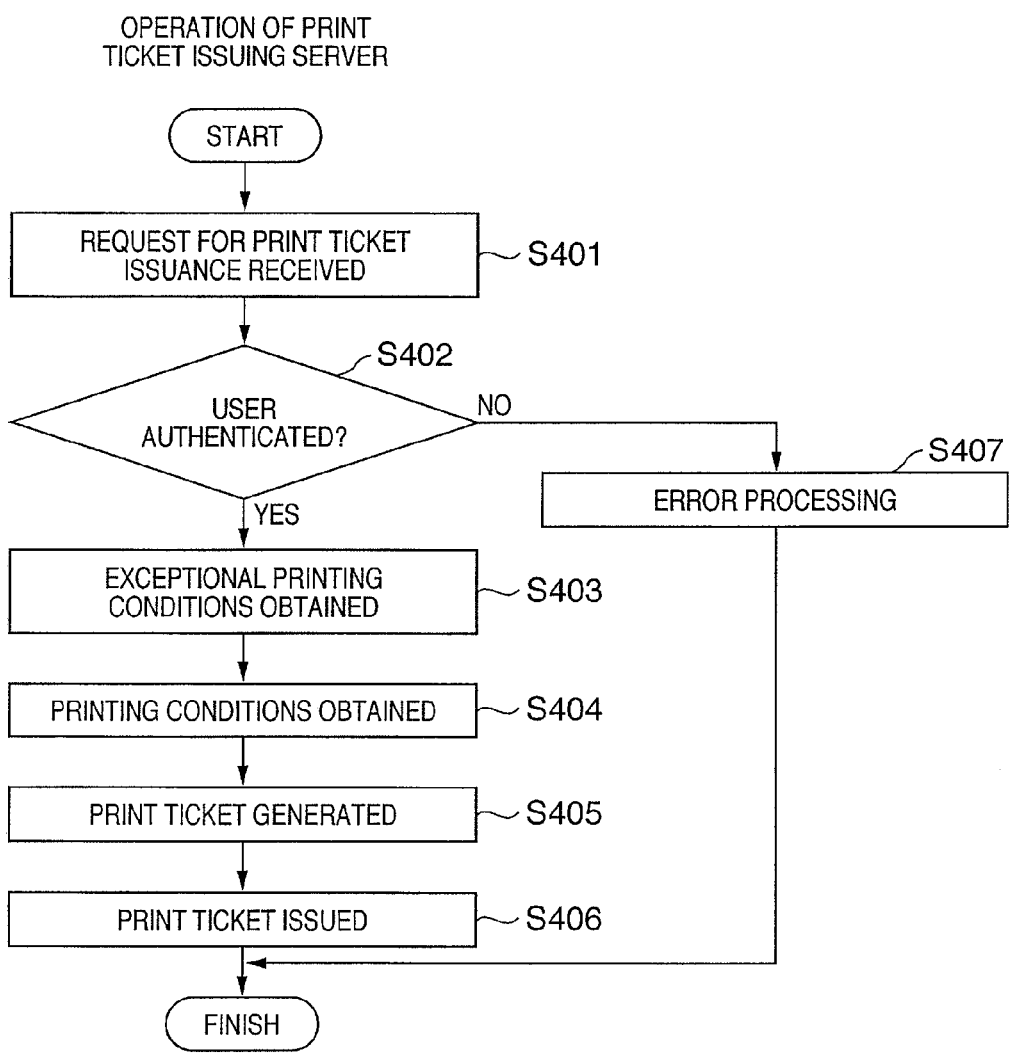
FIG. 6 is a flowchart showing a control procedure of the print-ticket issuing server according to the first embodiment of the present invention.

Next, description is given using FIG. 6 concerning a control procedure of the print-ticket issuing server 14.

FIG. 6 is a flowchart showing a control procedure of the print-ticket issuing server according to the first embodiment of the present invention.

In step S401, the data-transceiving unit 15 receives the print-ticket issuance request and information of the user from the client PC 1. In step S402, user authentication is carried out on the person who requested print-ticket issuance. With the authentication here, whether or not the user has been authenticated is determined by receiving from the OS on the client PC 1 information indicating that the user has logged onto the client PC 1 and completed user authentication.

If user authentication is completed by this determination, then in step S403, permission from the process-settings unit 17 for reuse of a print ticket already issued at the time of the occurrence of the breakdown of the server and reuse conditions (exceptional printing conditions) for when reuse is permitted are obtained. Next, in step S404, printing conditions assigned to the user who requested print-ticket issuance are obtained from the printing condition management unit 16.

Next, in step S405, a print ticket containing printing-condition information and information concerning the allowability of reusing the print ticket is generated by the print ticket-issuing unit 18. Next, in step S406, a process is carried out of issuing a print ticket to the client PC 1 from where the print-ticket request originated, then processing finishes.

On the other hand, when the determination in step S402 is that user authentication has failed, an error process is executed in step S407. This error process involves for example sending notification to the client PC 1 from where the print-ticket request originated to the effect that user authentication has failed and a print ticket cannot be issued.

The above concerned processing for print-ticket issuance by the print-ticket issuing server 14.

Figure 7:
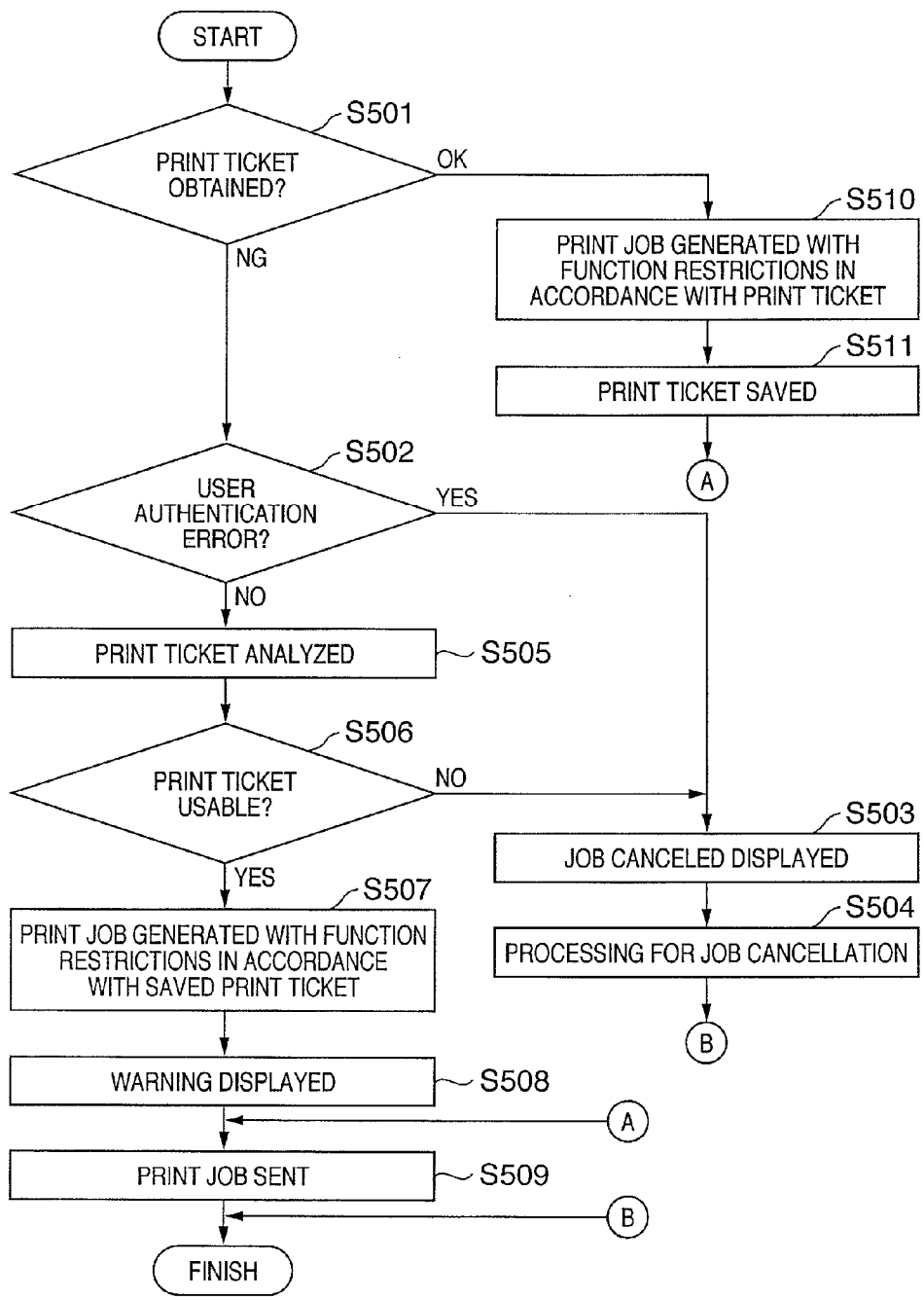
FIG. 7 is a flowchart showing a print data generating process executed by the client PC according to the first embodiment of the present invention.

Next, description is given using FIG. 7 concerning processing for print-data generation, which is a part of the processing operations of the print-ticket control unit 5 and the print-job generating unit 9 of the client PC 1.

FIG. 7 is a flowchart showing a print-data generating process executed by the client PC according to the first embodiment of the present invention.

When the instruction for print commencement is given by a user, first, in step S501, the print-ticket obtaining unit 402c requests a print ticket from the print-ticket issuing server 14. When a print ticket cannot be obtained, the procedure proceeds to step S502.

In step S502, the print-ticket analyzing unit 402b determines whether or not the print ticket could not be obtained due to a user authentication error. If there is a user authentication error (Yes in step S502), then in step S503 the add-in unit 402 displays a warning to the effect that the print job will be canceled. In step S504, the add-in unit 402 executes a job-canceling process of canceling the print job and print processing finishes.

On the other hand, if there is no user authentication error (No in step S502), then it is determined that there is a breakdown in the print-ticket issuing server 14 and that processing for print-ticket issuance cannot be performed. In this case, in step S505 the print-ticket analyzing unit 402b obtains a print ticket that has been saved in the print-ticket saving unit 6. Next, in step S506, the print-ticket analyzing unit 402b analyzes the reuse conditions described in the print ticket.

In step S506, the print-ticket analyzing unit 402b makes a determination based on the analysis result as to whether or not the print ticket is usable. In particular, if reuse is not permitted or if reuse is permitted but the reuse conditions do not apply, the procedure proceeds to step S503. On the other hand, when the reuse conditions do apply, the print-ticket analyzing unit 402b saves the print ticket to the print-ticket saving unit 6 and the procedure proceeds to step S507.

In step S507, the printer driver 400 generates a print job in accordance with the printing conditions described in the print ticket that is saved in the print-ticket saving unit 6. The printing conditions described in the print ticket are added to the ordinary printing conditions and if the print instruction information has any additional information such as tints on the printing page, the print job is generated in accordance with those instructions.

Next, in step S508, the printer driver 400 displays a warning indicating that there is exceptional printing based on reuse of a print ticket. Then, in step S509, data is sent to the printer 19 by the data-transceiving unit 13 and processing finishes.

On the other hand, if a print ticket has been obtained in step S501, then in step S510 the printer driver 400 generates a print job in accordance with the printing conditions described in the obtained print ticket. Then, the print ticket obtained in step S511 is saved in the print-ticket saving unit 6.

The above concerned a process of generating print data with the client PC 1.

Next, a printing operation of the printer 19 is described using FIG. 8.

FIG. 8 is a flowchart showing a printing operation of the printer according to the first embodiment of the present invention.

In step S601, print data is received via the data-transceiving unit 20. In step S602, a print ticket added to print data is analyzed by the print-ticket processing unit 21. Next, in step S603, a determination is made by the print-ticket processing unit 21 as to whether or not the print ticket is to be reused. Here, in determining whether or not the print ticket is to be reused, first an ID that identifies the print ticket appended each time printing is carried out is stored and a collation is made with the stored ID of the print ticket. Then, based on a collation result, a determination is made as to whether or not the print ticket is to be reused.

It should be noted that print-ticket IDs are managed by the print-ticket issuing server 14 and a unique ID is described in the print ticket each time a print ticket is issued.

When a determination is made in step S603 that the print ticket is to be reused (Yes in step S603), the procedure proceeds to step S604 and the print-ticket processing unit 21 confirms whether or not a breakdown has occurred in the print-ticket issuing server 14.

When no breakdown has occurred (Yes in step S604), the procedure proceeds to step S613 and the print-ticket processing unit 21 cancels printing of the received print data. After this, the procedure proceeds to step S612.

On the other hand, if a breakdown has occurred (No in step S604), then a determination is made in step S605 as to whether or not this is the first time for this breakdown. If it is not the first time (No in step S605), then the procedure proceeds to step S607. If it is the first time (Yes in step S605), then in step S606 the print-ticket processing unit 21 gives notification to a specified destination for notification (for example, the administrator's terminal of the administrator of the print-ticket issuing server 14) to the effect that a breakdown has occurred in the print-ticket issuing server 14.

It should be noted that the determination in step S605 is made for example based on the presence/absence of a flag that is set in the RAM 303 and that indicates whether a breakdown has occurred for the first time.

Next, in step S607, the print-ticket processing unit 21 confirms the reuse conditions of the print ticket. If a result of the confirmation is that the reuse conditions are not in agreement, then the procedure proceeds to step S614 and printing of the received print data is canceled. After this, the procedure proceeds to step S612. On the other hand, if these are in agreement, then the procedure proceeds to step S608.

It should be noted that one method of confirming the reuse conditions of the print ticket in step S607 is confirming whether a reuse permission is set in the print ticket and if there is a reuse prohibition set, then the reuse conditions are deemed not satisfied.

Next, in step S608, a print-restriction process is carried out by the printing-apparatus control unit 22 in accordance with the printing conditions described in the print ticket. In step S609, a process of analyzing the print data is carried out by the printing-page-data processing unit 23. In step S610, image generation is carried out by the printing-page-data processing unit 23.

In step S611, printing output is carried out by the output unit 24. In step S612, a print log specified in the print ticket is generated and saved by the printing-apparatus control unit 22 and processing finishes. At this time, when the print ticket has been reused regardless of there being no breakdown in the server, the printing is canceled and a record of this is also left as a log.

On the other hand, if a determination is made in step S603 that the print ticket is not being reused (No in step S603), then in step S613 the flag indicating that the breakdown of the print-ticket-issuing server 14 has occurred for the first time is cleared and the procedure proceeds to step S608.

The above concerns a print processing operation of the printer 19. Furthermore, print-ticket validity is determined for the printer 19 by determinations in step S603, step S604, and step S607. This is because, when the print ticket is being reused regardless of there being no breakdown in the server, the print data appended to that print ticket is canceled as being improper usage. Furthermore, this is because even if reuse is permitted, if the reuse conditions are not met, the print data appended to that print ticket is canceled.

As described above, with the first embodiment, even in circumstances where print tickets cannot be issued due to a breakdown such as the management server that issues device-control information relating to device usage being down, print processing is allowed based on print tickets that were saved prior to the breakdown. In this way, a printing control system can be provided that is capable of carrying out print processing without lowering the security level.

Second Embodiment

In the first embodiment, print tickets that had been saved were reused when print tickets could not be obtained, but there is no limitation to this. In a second embodiment, when print tickets cannot be obtained, a process of generating print data is carried out in accordance with printing conditions described in print tickets that have been saved. Then, after completion of print-data generation, obtaining of print tickets is once again carried out. Here, a configuration may be used in which if obtaining of print tickets is achieved, the newly obtained print tickets are added and the printer is made to carry out printing, but if print tickets still cannot be obtained, saved print tickets are reused.

Furthermore, a configuration may be used in which print tickets are saved as part of a print log by the printer 19 without storing print tickets on the client PC 1. In this case it is easily conceivable that a query is made from the client PC 1 to the printer 19 as to whether or not the print ticket attached to the last print job issued by the client PC 1 is present, and if it has been saved, that print ticket is obtained from the printer 19 and reused.

Furthermore, although the above embodiments were described using an example of a case in which a plurality of information-processing apparatuses (client PC 1 and print-ticket management server 14) and devices (image-processing apparatuses (printer 19)) were operated in cooperation to achieve the embodiment, there is no limitation to this. For example, it is understood that the present invention may be embodied by combining the various structural elements for achieving these embodiments into a single information-processing apparatus and achieving the effects of the present embodiments with this information processing apparatus and devices.

More specifically, it is possible to use a system given an information-processing apparatus (an information-processing apparatus having both the function of a server and the function of a client) in which the various functions of the client PC 1 and the print-ticket management server 14 are combined for the printer 19.

Furthermore, the above embodiments were described using an example of a case in which a printing function of the printer 19 was used, but there is no limitation to this. That is, embodiments can also be applied to other functions that can be used on the printer 19 (for example, a scanning function, a faxing function, and a data transmission function).

Moreover, each of the databases shown in FIG. 1 is shown as an example configured within a PC, but these may be configured within a network storage device connected on the network 100.

Furthermore, a configuration may be used in which only job settings are sent as settings within a range of the device-restriction information without sending the device-control information.

With the present embodiment, function restrictions relating to devices can be maintained while improving convenience by appropriately allowing function usage even during occurrences of breakdowns.

There may be provided an apparatus comprising a single device or to system constituted by a plurality of devices.

Furthermore, embodiments can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions are implemented by computer, the program code installed in the computer may also embody the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program embodying the present invention or an automatically-installable compressed file of the program can be downloaded to a recording medium such as a hard disk. Further, the program can be supplied by dividing the program code constituting the program into a plurality of files and downloading the files from different websites. In other words, a WWW (World Wide Web) server that downloads, to multiple users, the program files that implement the functions by computer may also embody the present invention.

It is also possible to encrypt and store a program embodying the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100391 filed on Mar. 31, 2006, which is hereby incorporated by reference herein in its entirety.

What is claimed is:

1. A device-management system comprising a management apparatus, an information-processing apparatus that issues a job according to an instruction for print commencement by a user, and a device for processing the job, wherein the management apparatus comprises:
an issuing unit constructed to issue device-control information indicating usage restriction of the device to the information-processing apparatus, wherein the information-processing apparatus comprises:
a first receiving unit constructed to receive the device-control information issued by the issuing unit;
a determination unit constructed to determine whether or not the first receiving unit has received the device-control information;
a transmission unit constructed to transmit, to the device, a job to be executed within the scope of the device-control information received by the first receiving unit in the case that the determination unit determines that the first receiving unit has received the device-control information from the management apparatus;
a holding unit constructed to hold, after transmitting the job, the device-control information received by the first receiving unit;
an obtaining unit constructed to obtain the device-control information held by the holding unit in the case that the determination unit determines that the first receiving unit has not received the device-control information; and
a generation unit constructed to generate a job for processing on the device, based on a permission condition indicating that reuse of the device-control information obtained by the obtaining unit is permitted,
wherein log information to be held at the time of reuse of the device-control information is specified as the permission condition,
wherein the device-control information includes an ID which is used by the device for determining whether or not the device-control information is to be reused,
wherein, in the case that the determination unit determines that the device-control information has not been received by the receiving unit from the management apparatus and reuse of the device-control information held by the holding unit is permitted, the transmission unit transmits to the device via a network the job generated by the generation unit after outputting warning information indicating that an exceptional process is being performed based on the reuse of the device-control information held by the holding unit, and
wherein, in the case that the determination unit determines that the device-control information has not been received by the receiving unit from the management apparatus and the reuse of the device-control information held by the holding unit is not permitted, the instruction for print commencement is canceled without generation of a job by the generation unit,
wherein the device comprises:
a second receiving unit constructed to receive a job sent by the transmission unit from the information-processing apparatus; and
a processing unit constructed to process the job received by the second receiving unit within the scope of the device-control information.

2. An information-processing apparatus for transmitting, to a device, a job associated with device-control information indicating usage restriction of the device according to an instruction for print commencement by a user, the information-processing apparatus comprising:
a receiving unit constructed to receive the device-control information from a management apparatus;
a determination unit constructed to determine whether or not the device-control information has been received by the receiving unit from the management apparatus;
a transmission unit constructed to transmit, to the device, a job to be executed within the scope of the device-control information received by the receiving unit in the case that the determination unit determines that the device-control information has been received by the receiving unit from the management apparatus;
a holding unit constructed to hold, after transmitting the job, the device-control information received by the receiving unit;

an obtaining unit constructed to obtain the device-control information held by the holding unit in the case that the determination unit determines that the device-control information has not been received by the receiving unit from the management apparatus; and a generation unit constructed to generate a job for processing on the device, based on a permission condition indicating that reuse of the device-control information obtained by the obtaining unit is permitted, wherein log information to be held at the time of reuse of the device-control information is specified as the permission condition, wherein the device-control information includes an ID which is used by the device for determining whether or not the device-control information is to be reused, wherein, in the case that the determination unit determines that the device-control information has not been received by the receiving unit from the management apparatus and reuse of the device-control information held by the holding unit is permitted, the transmission unit transmits, to the device, the job generated by the generation unit after outputting warning information indicating that an exceptional process is being performed based on the reuse of the device-control information held by the holding unit, and wherein, in the case that the determination unit determines that the device-control information has not been received by the receiving unit from the management apparatus and the reuse of the device-control information held by the holding unit is not permitted, the instruction for print commencement is canceled without generation of a job by the generation unit.

3. An information-processing apparatus according to claim 2, further comprising an output unit constructed to, when the device-control information cannot be received from the management apparatus and reuse of the device-control information held by the holding unit is not permitted, output warning information to the effect that the job will be canceled.

4. An information-processing apparatus according to claim 2, wherein the permission condition indicates permission for using functions of the device contained in the device-control information obtained by the obtaining unit.

5. An information-processing apparatus according to claim 2, wherein the permission condition is contained in the device-control information obtained by the obtaining unit.

6. An information-processing apparatus according to claim 2, wherein the permission condition further includes at least one of a number-of-times-of-usage restriction, a usage period, and instruction information indicating a process description on the device.

7. A control method for an information-processing apparatus that sends to a device a job including device-control information indicating usage restriction of the device according to an instruction for print commencement by a user, comprising the steps of:

receiving the device-control information from a management apparatus;

determining whether or not the device-control information has been received by the information-processing apparatus from the management apparatus;

transmitting, to the device, a job to be executed within the scope of the device-control information received in the receiving step in the case that it is determined in the determination step that the device-control information has been received by the information-processing apparatus from the management apparatus;

holding, after transmitting the job, the device-control information received in the receiving step;

obtaining the device-control information held in the holding step in the case that it is determined in the determination step that the device-control information has not been received by the information-processing apparatus from the management apparatus; and generating a job for processing on the device, based on a permission condition indicating that reuse of the device-control information obtained in the obtaining step is permitted, wherein log information to be held at the time of reuse of the device-control information is specified as the permission condition, wherein the device-control information includes an ID which is used by the device for determining whether or not the device-control information is to be reused, wherein, in the case that the determining step determines that the device-control information has not been received by the receiving step from the management apparatus and reuse of the device-control information held in the holding step is permitted, in the transmitting step, the job generated by the generating step is transmitted to the device after outputting warning information indicating that an exceptional process is being performed based on the reuse of the device-control information held in the holding step, and wherein, in the case that it is determined that the device-control information has not been received from the management apparatus and the reuse of the device-control information is not permitted, the instruction for print commencement is canceled without generation of a job.

8. A non-transitory computer-readable storage medium storing a computer program for executing the control method according to claim 7 on a computer.

* * * * *